United States Patent [19]

Cook

[11] Patent Number: 4,851,952
[45] Date of Patent: Jul. 25, 1989

[54] CIRCUIT FOR PREVENTION OF UNDESIRED OPERATION IN MULTIPLE POWER DRIVERS

[75] Inventor: Roger J. Cook, Livonia, Mich.

[73] Assignee: Ford Motor Company, Dearborn, Mich.

[21] Appl. No.: 181,999

[22] Filed: Apr. 15, 1988

[51] Int. Cl.[4] ............................................. H02H 3/24
[52] U.S. Cl. .................................... 361/92; 361/187;
307/130; 340/663
[58] Field of Search .................. 361/23, 33, 86, 88,
361/92, 168.1, 169.1, 187; 307/10 R, 130;
340/663

[56] References Cited

U.S. PATENT DOCUMENTS

| | | | |
|---|---|---|---|
| 3,578,983 | 5/1971 | Kondo | 307/253 X |
| 3,591,832 | 6/1971 | Pelka | 361/93 |
| 3,599,042 | 8/1971 | Andrews | 361/93 |
| 4,158,866 | 6/1979 | Baker | 361/86 |
| 4,618,780 | 10/1986 | Ikoma et al. | 361/92 X |

Primary Examiner—Derek S. Jennings
Attorney, Agent, or Firm—Allan J. Lippa; Peter Abolins

[57] ABSTRACT

A switching module having a plurality of switching channels responsive to a microcontroller for coupling electrical power to a load, and decoupling electrical power in the event an undesired operating condition is sensed. Each switching channel includes a switching transistor and transistor driver. Monitoring circuitry senses the actual voltage drop across the load to provide the controller with an indication of undesired operation. A limiting resistor limits the transistor drive such that the transistor is forced out of satuaration during a high power condition, thereby avoiding undesired power dissipation which would otherwise occur if operation in the saturated condition continued.

21 Claims, 2 Drawing Sheets

CIRCUIT FOR PREVENTION OF UNDESIRED OPERATION IN MULTIPLE POWER DRIVERS

BACKGROUND OF THE INVENTION

This invention relates generally to protection circuits for electronic circuitry.

An electronic switching module includes a plurality of switching channels actuated by a controller or electronic processor. Each of the switching channels includes a power driver or switching transistor for coupling and decoupling electrical power to a load or accessories. The switching module is often located in a host module wherein other electronics, such as a microcomputer, are located. In automobile applications in particular, failures in either the switching module, host module, or accessory cannot be tolerated.

Protection circuits are known for protecting against overload or short conditions by detecting either excessive voltage drops across the switching transistor or measuring excessive current through a switching transistor. Both forms of detection occur when either the overload or the short forces the switching transistor out of saturation. A separate protection circuit is required for each switching transister. In response to the detection, the switching transistor is shut off. Examples of devices of this type are disclosed in U.S. Pat. Nos. 3,578,983; 3,591,832; 3,599,042; and 4,158,866.

The inventors herein have recognized numerous disadvantages of the prior approaches. In automobile applications, in particular, more than short circuit or overload protection is needed. Any degradation in the performance of either the switching module or the host module should be avoided. For example, considering the high density packaging and environment of these modules, unusual heat dissipation of the switching transistor may result in massive module failures. Thus, short circuit or overload protection as described above with respect to the prior approaches is not adequate. Further, application of low voltages to some automobile accessories, such as solenoids, may either fail to actuate the accessory or damage the accessory.

An additional disadvantage of the prior approaches is that a separate protection circuit is required for each switching transistor. The number of additional components and interconnections required to protect a plurality of switching transistors is therefore prohibitive in a module having a high density of electronic components.

SUMMARY OF THE INVENTION

An object of the present invention is to provide a switching module having protection from low output voltage conditions and high temperature operation, in addition to protection from short circuits and overloads.

The above and other objects are achieved and the above problems and disadvantages overcome by providing a switching module having a plurality of switching channels, each switching electrical power to a load and deactuating the electrical power in the event that the voltage drop across the load is below a preselected level. In one particular embodiment in which the invention is used to advantage, the switching module comprises: controller means having a separate output port coupled to each of the channels for providing a control signal to actuate the load and for deactuating the control signal in response to a low voltage indicator signal; switching means in each of the switching channels responsive to the control signal for switching electrical power to the load, the switching means comprising a switching transistor having a control electrode coupled to the output port, a first output electrode coupled to a voltage reference, and a second output electrode coupled to the load; driver means in each of the switching channels coupled between the output port and the control electrode for providing a drive signal in response to the control signal; limiting means in each of the switching channels coupled between the control electrode and the driver means for limiting the drive signal to force the switching transistor out of saturation at a predetermined output power of the switching transistor; and level sensing means coupled to each of the second output electrodes for providing the low voltage indicator signal when the voltage drop across the load is less than the preselected level.

By sensing the voltage drop directly across the load, and establishing the preselected voltage level accordingly, low voltage conditions which may be insufficient to actuate some loads, such as solenoids, are avoided. An advantage is thereby obtained of preventing the application of a low voltage to an accessory which may either damage the accessory or not be sufficient to actuate the accessory.

Another advantage is that the switching transistor is prevented from operating at an undesired output power level which might otherwise cause excessive heat to build up in the switching module thereby damaging components within the switching module and also the host module. Thus, the shortcomings of prior approaches are overcome wherein a short circuit or overload of the accessory was required to force the switching transistor out of saturation. Stated another way, in prior approaches the switching transistor was free to operate at an undesired high output power while in the saturated condition. This disadvantage is overcome by limiting the drive signal to force the switching transistor out of saturation at a predetermined output power.

Still another advantage of the invention is that only a single level sensing means is required for a plurality of switching channels thereby eliminating much of the additional components and interconnections of prior approaches.

DESCRIPTION OF THE PREFERRED EMBODIMENT

Figure 1:
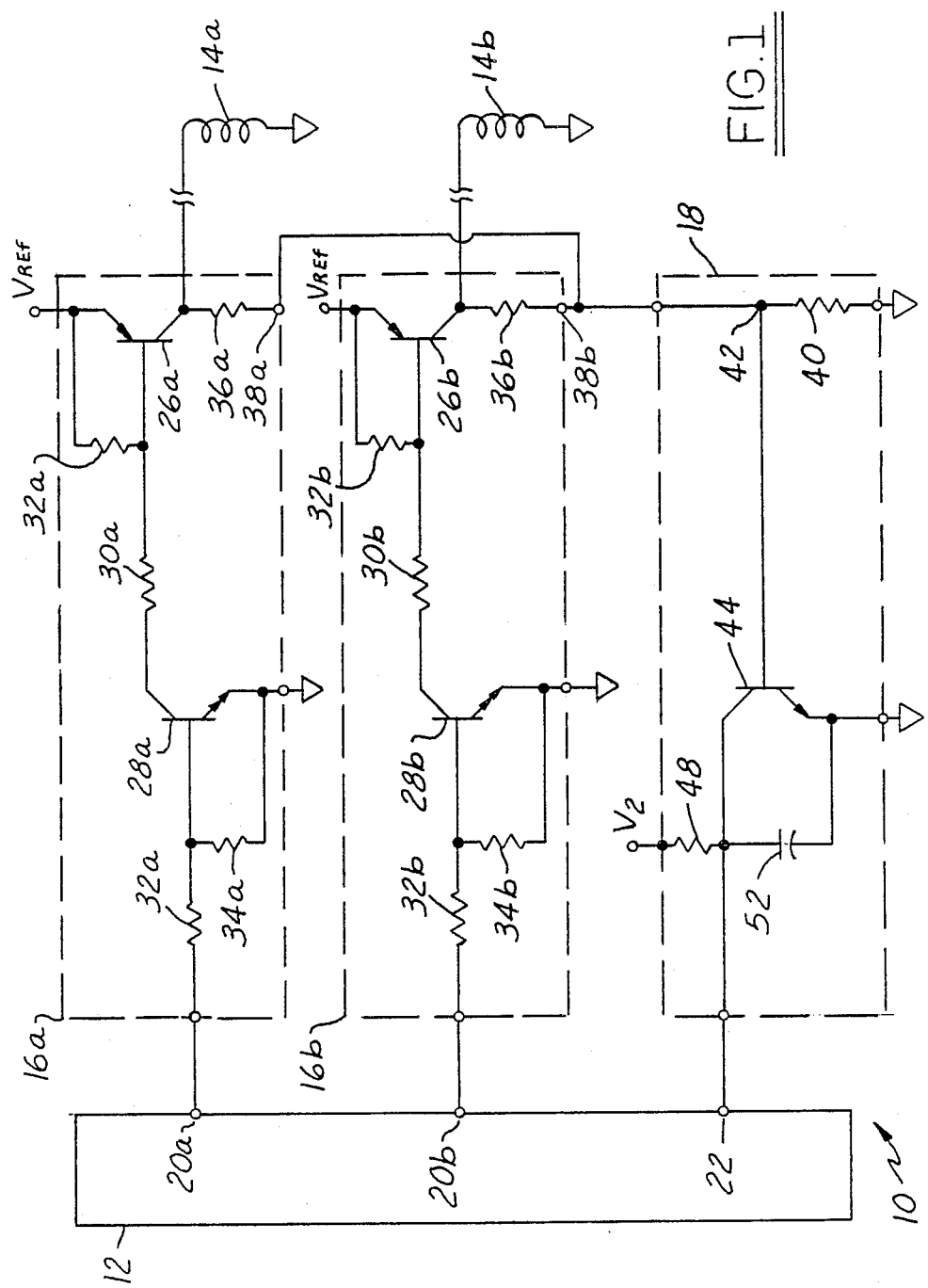
FIG. 1 is an electrical schematic of an embodiment in which invention is used to advantage.

In general terms, with reference to FIG. 1, an electrical schematic of switching module 10 is shown having a microcontroller 12 for actuating and deactuating a plurality of automobile accessories or component devices, inductive loads 14a and 14b in this example, via respective switching channels 16a and 16b. As described in greater detail hereinafter, sensing circuitry 18, in cooperation with switching channels 16a or 16b, senses undesired operating conditions in either switching module 10, load 14a or load 14b.

The particular embodiment described herein relates to a usage wherein loads 14a and 14b, or any other plurality of loads monitored by sensing circuitry 18, are not concurrently on. For example, in the case of a switching module used in conjunction with an automobile's computer controlled suspension, loads 14a and 14b may be representative of opposing pairs of air spring solenoid valves which are not on at the same time. In a further example relating to a computer controlled suspension, loads 14a and 14b may respectively be representative of soft ride and harsh ride air shock valves which have opposing operating states.

During normal operation, microcontroller 12 provides a control signal on either output port 20a or 20b for coupling voltage reference ($V_{REF}$) to loads 14a or 14b, respectively. A predetermined time delay after either load is actuated, controller 12 monitors sensing circuit 18 at input port 22. In the event that an undesired operating condition associated with a particular load or respective switching channel is detected, controller 12 deactivates that switching channel and, accordingly, the respective load is decoupled from $V_{REF}$. A restart cycle is then initiated after another predetermined time delay in the event that the undesired operating condition was erroneous, such as may occur due to electrical noise. More specifically, controller 12 reactivates the same channel and again monitors sensing circuitry 18. If the same indication persists, after a predetermined number of restarts, that channel is prohibited from further actuation and a fault indication is stored in microcontroller 12 for diagnostic and repair procedures to be performed by a technician.

A more detailed description of switching module 10 is now provided. High side power switch, PNP switching transistor 26a in this example, is shown having an emitter electrode connected to a voltage reference ($V_{REF}$), preferably battery voltage, and a collector terminal connected to load 14a, a solenoid coil in this example. Load 14a is shown connected in series between the collector terminal of switching transistor 26a and a voltage return, preferably ground. Resistor 36a, shown coupled between the collector terminal of switching transistor 26a and output terminal 38a, forms part of a voltage divider with resistor 40 of sensing circuitry 18 for reasons described hereinafter.

Darlington transistor 28a, shown as a NPN transistor having an emitter electrode coupled to the voltage return and collector electrode coupled to the base of switching transistor 26a through limiting resistor 30a, provides base drive to switching transistor 26a. Resistor 32a is shown coupled between $V_{REF}$ and the base terminal of switching transistor 26a for providing noise immunity during the off state of switching transistor 26a.

Microcontroller 12 provides a logic 1 signal, preferably a positive voltage, at output port 20a when other electronic control circuitry (not shown), or operator command, determines that $V_{REF}$ is to be applied to load 14a. Resistors 32a and 34a form a voltage divider between output port 20a and the base of Darlington transistor 28a for providing proper voltage biasing and noise immunity.

During normal operation, a positive output voltage from output port 20a turns on Darlington transistor 28a thereby providing base drive to switching transistor 26a through limiting resistor 30a. Switching transistor 26a then turns on in the saturated region providing a low emitter-collector or internal impedence. With switching transistor 26a operating in the saturated region, substantially all of $V_{REF}$ is applied across load 14a.

Reference is now made to switching channel 16b wherein like numerals refer to like parts of switching channel 16a. Switching channel 16b is shown coupled between output port 20b of microcontroller 12 and load 14b for switching $V_{REF}$ to load 14b. The structure and circuit operation of switching channel 16b is the same as described with reference to switching channel 16a. It is to be noted that the invention described herein may be practiced with any number of switching channels even though two are described in the example presented herein for convenience of illustration.

With reference to sensing circuit 18, resistor 40 is shown connected in series between node 42 and the voltage return. As described further hereinafter, resistor 40 is the second resistor of a voltage divider. The first resistor of the voltage divider is either resistor 36a or resistor 36b of respective switching channels 16a and 16b dependent upon which of the switching channels is actuated. Node 42 is shown connected to both resistors 36a and 36b of respective switching channels 16a and 16b via respective terminals 38a and 38b.

Transistor 44, a low voltage NPN transistor in this example, is shown having its base electrode connected to node 42, its emitter electrode connected to the voltage return, and its collector electrode connected to second voltage reference ($V_2$) via resistor 48. Capacitor 52 is shown connected between the emitter and collector electrodes of transistor 44 for noise immunity. The collector of transistor 44 is also shown connected to input port 22 of microcontroller 12 for providing an indication of whether or not the switching channels and loads are operating in a desired manner, as described in greater detail hereinbelow.

Figure 2:
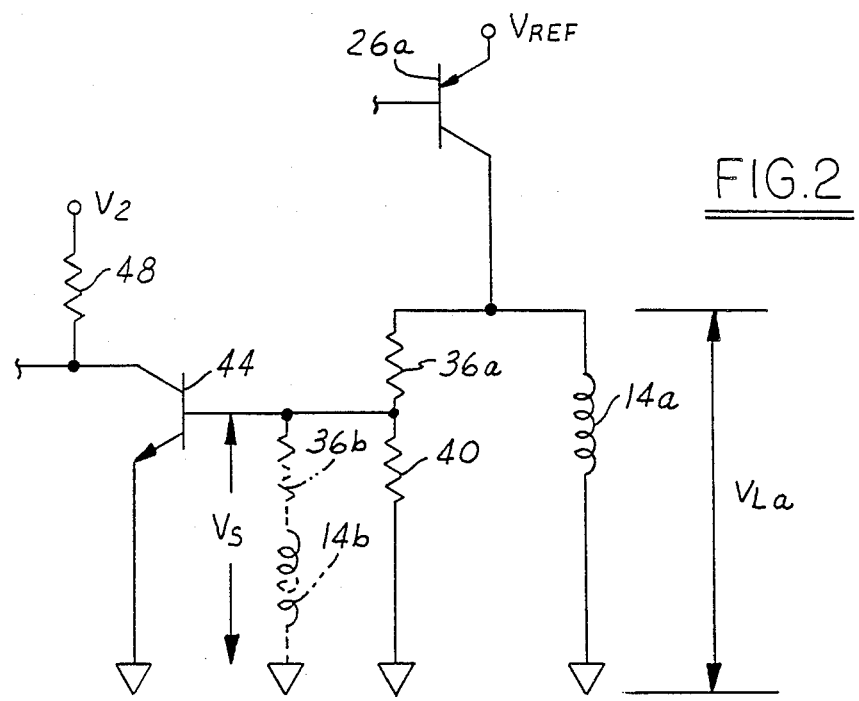
FIG. 2 is an electrical schematic of a portion of the electrical schematic shown in FIG. 1.

Referring now to FIG. 2, an electrical schematic is shown to illustrate operation herein during a condition wherein transistor 26a is in the on state and transistor 26b is in the off state. In this example, resistors 36a and 40 form respective first and second resistors of a resistive voltage divider for dividing the voltage drop ($V_{La}$) across load 14a. It is to be noted that although the second resistor of the voltage divider is actually the parallel combination of resistor 40 with resistor 36b and load 14b, the impedance values may be such that substantially all of the impedance of the second voltage divider resistor is attributed to resistor 40. In the example presented herein, the impedance of load 14b is negligible, and the ratio of resistor 36a to resistor 40 is approximately 10:1. Thus, the resistive values of the voltage divider are essentially defined by resistors 36a and 40.

As determined by the voltage divider, the voltage drop ($V_s$) across resistor 40 is proportional to the voltage drop across load 14a ($V_{La}$). The values of the voltage divider, and $\beta$ of transistor 44, are chosen such that transistor 44 will turn on at a preselected value of $V_s$ and, accordingly, a preselected value of $V_{La}$. When transistor 44 turns on, the voltage return or logic 0 signal is applied to input port 22 of microcontroller 12 through the collector-emitter junction of transistor 44. In the event that $V_s$ is less than the preselected value, that is, when $V_{La}$ is too low, transistor 44 remains off and a logic 1 or high voltage is applied to input port 22.

In operation, microcontroller 12 turns on a switching channel and samples input port 22 a predetermined time delay afterwards. When a logic 0 is present, normal operating conditions are indicated and no further action is required. On the other hand, when a logic 1 is present, a low voltage across the load or undesired operation is indicated. Microcontroller 12 then deactivates that switching channel and initiates a restart after a predetermined time delay, as previously discussed.

In general, undesired operations of the switching channels or loads are indicated when the voltage drop across a particular load ($V_{La}$) is less than a desired or preselected value. One example of an undesired operation is when a fault, such as wiring, battery or a faulty switching channel, results in a low voltage output. In this case, the affected load is deactuated through operation of microcontroller 12 to prevent damage to the load. For example, in a case wherein the load is an electric motor, the application of a low voltage would otherwise damage the motor.

Another example of an undesired operation is when sufficient emitter-collector current passes through the switching transistor to thermally damage either switching module 10 or the host module (not shown) having switching module 10 mounted therein. The invention herein prevents thermal damage as follows. Limiting resistor 30a is selected to limit the base drive to switching transistor 26a such that, when a preselected emitter-collector current is exceeded, switching transistor 26a is forced out of saturated operation. The internal impedence of switching transistor 26a is thereby dramatically increased, resulting in a decreased voltage drop across load 14a. As previously describe herein, sensing circuitry 18 then provides microcontroller 12 with an indication of undesired operation. Thus, unlike prior approaches, the switching transistors are not free to operate over the entire saturated region. Dependent upon desired thermal conditions, a switching transistor is prohibited from conducting over a portion of the saturated region to prevent the dissipation of an undesired amount of heat.

Still another example of undesired operation occurs during shorted load or overload conditions. Again, referring to switching transistor 26a, limiting resistor 30a limits the base drive to transistor 26a thereby forcing the transistor out of saturated operation when the emitter-collector current exceeds a preselected value. Sensing circuitry 18 then provides an indication of undesired operation to microcontroller 12, as previously described. An additional advantage in forcing the switching transistor out of saturation, rather than waiting for the overload to pull it out of saturation, is that faster response time is achieved thereby avoiding electrical damage to the switching transistor.

A self test mode is now described wherein the invention may be used to advantage. The self test mode is particularly useful in embodiments wherein the switching channels are concurrently actuated. During the self test mode, microcontroller 12 sequentially actuates each of the loads for a predetermined time. This predetermined time, or actuation period, is made sufficiently short such that the actuated accessory does not become fully operational. A predetermined delay after each actuation period, microcontroller samples input port 22 for a low voltage signal. In the event that an undesired operating condition is indicated, an operator readable format is provided indicating the affected accessory.

This concludes the description of the preferred embodiment. The reading of it by those skilled in the art will bring to mind many alterations and modifications without departing from the spirit and scope of the invention. For example, the invention may be practiced to advantage with any number of desired switching channels. Further, portions of the switching channels may be grouped which are not concurrently on, and a separate sensing circuit provided to each of those grouped switching channels. Accordingly, it is intended that the scope of the invention be limited only by the following claims.

I claim:

1. A switching module having a plurality of switching channels, each switching electrical power to a load and deactuating the electrical power in the event that the voltage drop across the load is below a preselected level, said switching module comprising:
   controller means coupled to each of said channels for providing a control signal to actuate the load and for deactuating said control signal in response to a low voltage indicator signal;
   a switching transistor having a control electrode coupled to said controller means, a first output electrode coupled to a voltage reference, and a second output electrode coupled to the load;
   driver means in each of said switching channels coupled between said controller means and said control electrode for providing a drive signal in response to said control signal;
   limiting means in each of said switching channels coupled between said control electrode and said driver means for limiting said drive signal to force said switching transistor out of saturation when said drive signal exceeds a predetermined value; and
   level sensing means coupled to each of said second output electrodes for providing said low voltage indicator signal when the voltage drop across the load is less than the preselected level.

2. The switching module recited in claim 1 wherein said controller means samples for said low voltage indicator signal a predetermined time after providing said control signal.

3. The switching module recited in claim 2 wherein said switching transistor comprises a PNP transistor and wherein said control electrode comprises a gate electrode and wherein said first output electrode comprises an emitter electrode and wherein said second output electrode comprises a collector electrode.

4. The switching module recited in claim 3 wherein the load is connected in series between said collector electrode and a voltage return.

5. The switching module recited in claim 4 wherein said level sensing means comprises:
   a resistive voltage divider coupled in parallel across each of the loads; and
   signal gain means coupled to said resistive voltage divider for providing said low voltage indicator signal.

6. The switching module recited in claim 5 wherein said resistive voltage divider comprises: a first resistor coupled in series between said collector electrode of each of said switching transistors and a node; and a second resistor coupled between said node and said voltage return.

7. A switching module having a plurality of switching channels, each switching electrical power to a load and deactuating the electrical power in the event that the voltage drop across the load is below a preselected level, said switching module comprising:
   controller means having a separate output port coupled to each of said channels for providing a control signal to actuate the load and for deactuating said control signal in response to a low voltage indicator signal applied to an input port;
   switching means in each of said switching channels responsive to said control signal for switching electrical power to the load, said switching means comprising a switching transistor having a control electrode coupled to said output port, a first output electrode coupled to a voltage reference, and a second output electrode coupled to the load;

driver means in each of said switching channels coupled between said output port and said control electrode for providing a drive signal in response to said control signal;

limiting means in each of said switching channels coupled between said control electrode and said driver means for limiting said drive signal to force said switching transistor out of saturation at a predetermined output power of said switching transistor; and level sensing means coupled to each of said second output electrodes for providing said low voltage indicator signal when the voltage drop across the load is less than the preselected level.

8. The switching module recited in claim 7 wherein said controller means samples said input port for said low voltage indicator signal a predetermined time after providing said control signal.

9. The switching module recited in claim 8 wherein said switching transistor comprises a PNP transistor and wherein said control electrode comprises a gate electrode and wherein said first output electrode comprises an emitter electrode and wherein said second output electrode comprises a collector electrode.

10. The switching module recited in claim 9 wherein the load is connected in series between said collector electrode and a voltage return.

11. The switching module recited in claim 10 wherein said level sensing means comprises:
a resistive voltage divider coupled in parallel across each of the loads; and
signal gain means coupled to said resistive voltage divider for providing said low voltage indicator signal.

12. The switching module recited in claim 11 wherein said resistive voltage divider comprises: a first resistor coupled in series between said collector electrode of each of said switching transistors and a node; and a second resistor coupled between said node and said voltage return.

13. The switching module recited in claim 7 wherein only one of said output ports is actuated at any one time.

14. The switching module recited in claim 7 wherein said controller includes means for self-testing said switching module, comprising:
means for sequentially actuating each of the loads for a predetermined time duration;
means for sampling said low voltage indicator signal a predetermined time delay after each of the loads has been actuated; and
means responsive to said sampling means for providing an indication of an undesirable operating condition.

15. A switching module having a plurality of switching channels, each switching electrical power to a load and deactuating the electrical power in the event that the voltage drop across the load is below a preselected level, said switching module comprising:

controller means having a separate output port coupled to each of said channels for providing a control signal to actuate the load and for deactuating said control signal in response to a low voltage indicator signal applied to an input port, said controller actuating only one of said output ports at any one time;

a switching transistor having a control electrode coupled to said output port, a first output electrode coupled to a voltage reference, and a second output electrode coupled to the load;

limited driver means in each of said switching channels coupled between said output port and said control electrode for providing a drive signal in response to said control signal and for limiting said drive signal to force said switching transistor out of saturation at a predetermined output power of said switching transistor; and level sensing means coupled to each of said second output electrodes for providing said low voltage indicator signal when the voltage drop across the load is less than the preselected level.

16. The switching module recited in claim 15 wherein said controller means samples said input port for said low voltage indicator signal a predetermined time after providing said control signal.

17. The switching module recited in claim 16 wherein said switching transistor comprises a PNP transistor and wherein said control electrode comprises a gate electrode and wherein said first output electrode comprises an emitter electrode and wherein said second output electrode comprises a collector electrode.

18. The switching module recited in claim 17 wherein the load is connected in series between said collector electrode and a voltage return.

19. The switching module recited in claim 18 wherein said level sensing means comprises:
a resistive voltage divider coupled in parallel across each of the loads; and
signal gain means coupled to said resistive voltage divider for providing said low voltage indicator signal.

20. The switching module recited in claim 19 wherein said resistive voltage divider comprises: a first resistor coupled in series between said collector electrode of each of said switching transistors and a node; and a second resistor coupled between said node and said voltage return.

21. The switching module recited in claim 20 wherein said limited driver means comprises:
a Darlington transistor having a base electrode coupled to said output port, an emitter electrode coupled to said voltage return, and a collector electrode coupled to both said gate electrode and said emitter electrode of said switching transistor;
a first resistor coupled between said collector electrode of said Darlington transistor and said gate electrode of said switching transistor; and
a second resistor coupled between said emitter electrode and said gate electrode of said switching transistor.

* * * * *